United States Patent
Svensson et al.

(10) Patent No.: US 8,250,667 B2
(45) Date of Patent: Aug. 21, 2012

(54) ITERATIVE FEEDBACK TUNING IN A SCANNING PROBE MICROSCOPE

(75) Inventors: Krister Svensson, Gothenburg (SE); Paul Bengtsson, Floda (SE); Simon J. Altenburg, Kiel (DE)

(73) Assignee: Nanofactory Instruments AB, Göteborg (SE)

( * ) Notice: Subject to any disclaimer, the term of this patent is extended or adjusted under 35 U.S.C. 154(b) by 241 days.

(21) Appl. No.: 12/744,587

(22) PCT Filed: Dec. 1, 2008

(86) PCT No.: PCT/SE2008/051381
§ 371 (c)(1),
(2), (4) Date: Jun. 28, 2010

(87) PCT Pub. No.: WO2009/070119
PCT Pub. Date: Jun. 4, 2009

(65) Prior Publication Data
US 2011/0016592 A1  Jan. 20, 2011

Related U.S. Application Data

(60) Provisional application No. 60/991,239, filed on Nov. 30, 2007.

(51) Int. Cl.
*G01N 13/12* (2006.01)

(52) U.S. Cl. .................................. 850/3; 850/4

(58) Field of Classification Search .............. 850/3, 4
See application file for complete search history.

(56) References Cited

U.S. PATENT DOCUMENTS

| | | | |
|---|---|---|---|
| 6,714,892 B2 * | 3/2004 | Houge et al. | 702/155 |
| 7,569,077 B2 * | 8/2009 | Kollin | 850/19 |
| 2003/0137216 A1 | 7/2003 | de Miguel et al. | |
| 2006/0111863 A1 | 5/2006 | Suda et al. | |
| 2007/0033991 A1 | 2/2007 | Rice et al. | |

OTHER PUBLICATIONS

Piazzi, A. et al. "An iterative approach for noncausal feedforward tuning", American Control Conference, Jul. 2007, pp. 1251-1256.
Hjalmarsson, H. et al., "Iterative feedback tuning: theory and applications", Control Systems Magazine, Issue 4, Aug. 1998, pp. 26-41.
Al Mumun, A. et al., "Iterative feedback tuning (IFT) of hard disk drive head positioning", Industrial Electronics Society, 33rd Annual Conference, Nov. 2007, pp. 769-774.
Hadjiiski, L., et al., "Application of neural networks to a scanning probe microscopy system", Thin Solid Films 264, 1995, pp. 291-297.
International Search Report (PCT/ISA/210) dated Mar. 16, 2009.
Written Opinion of The International Searching Authority (PCT/ISA/237) dated Mar. 16, 2009.

* cited by examiner

*Primary Examiner* — Kiet T Nguyen
(74) *Attorney, Agent, or Firm* — Buchanan Ingersoll & Rooney PC

(57) ABSTRACT

A method, system, device, and software for automatically determining PI feedback parameters in a scanning probe microscopy application setup using an iterative feedback tuning process.

10 Claims, 8 Drawing Sheets

ITERATIVE FEEDBACK TUNING IN A SCANNING PROBE MICROSCOPE

TECHNICAL FIELD

The present invention is related to a method, system, and device for automatic feedback tuning of feedback parameters for a PI(D) (Proportional, Integral, Derivative) feedback in a scanning probe microscopy (SPM) application or similar applications.

BACKGROUND OF THE INVENTION

Nanotechnology requires highly technological instrumentation to detect and measure on nano scale objects. These objects are often quite delicate and may easily break during measurements and there is a need for solutions in instrumentation that decrease the risk of damaging the sample and at the same time provide fast and reliable measurement solutions.

Scanning tunnelling microscopy (STM) is one of the most important measurement techniques in surface physics and related subjects and has greatly contributed to the major developments in this field in the last 25 years.

The first precursor of the STM was the topografiner, developed by Russell Young, John Ward, and Fredric Scire, which was presented in 1972 in [1]. It was an instrument that could map the topography of a metal surface by scanning a sharp metal tip in a raster at small distance over the surface. Very similar to the STM the tip was moved using piezoelectric drivers and a feedback mechanism. A simple analogue PI-controller held a current between the surface and the tip constant, thus the distance between them. In case of the topografiner the current was a field emission current at higher tip surface distance, in opposite to the tunnelling current in STM. Although Young et al realized the possibility to scan at small distances to the surface in tunnelling mode, too high vibrations and problems with the accuracy of the feedback controller inhibited scanning in this mode. Still it is remarkable how much similarity to the modern STM was present.

Modern STMs generally use logarithmic feedback controllers that are more suitable for the tunnelling regime, but the approach of using an off-the-shelf PI or PID controller is still common. Modern digital controllers allow a wide range of different controller types, but the success of the PID controller has prevented a fundamental change yet. Another opportunity given by the digital approach is the possibility to easily implement complicated algorithms.

A proper tuning of the controller of the STM is quite difficult, especially for the PID controller, as an optimal state in a three dimensional parameter space has to be found (the tuning values for the proportional, the integral and the differential part). Another problem is that the user often has no information about the internal dependence of the parameters and a feeling for the influence of the different parameters has to be earned by a lot of experience with the specific software. An automatic tuning mechanism would simplify this procedure.

SUMMARY OF THE INVENTION

The solution according to the present invention uses an iterative feedback tuning method/algorithm optimized for SPM signals and control configuration.

The method/algorithm may be implemented in software instruction sets stored on a computer readable storage medium and run in a processing device or as instruction sets in hardware (e.g. FPGA, field programmable gate array, or an ASIC, application specific integrated circuit). The processing device may comprise a processor, memory (non-volatile and/or volatile), and a communication interface.

Even though the invention has been exemplified using an STM (Scanning tunnelling microscope) application, it is also usable in other scanning probe microscopy technologies such as AFM (atomic force microscopy), NSOM (near field scanning optical microscopy, MFM (magnetic force microscopy), and so on as understood by the skilled person.

Depending on SPM technology different types of signal(s) are used as input parameter(s) in the feedback system and different types of output signal(s) are generated for controlling the measurement system. Furthermore, different types of pre conditioning of signals may be of interest, such as considering the STM case the signals need to be linearized using a logarithmic expression and the current sign dependence is dealt with; other SPM technologies have other dependencies. The operation of SPM technologies are well known in the art.

A system according to the present invention comprises an SPM measurement system (e.g. comprising a position control device such as a piezo device, a tip holder, tip, and other parts for positioning the tip in relation to a sample of interest), a control electronics system (e.g. comprising voltage or current control devices for controlling the position control device, pre amplifiers and/or other pre conditioning units (filtering and so on), digitalization units, control processing device(s), communication unit(s), and so on), and an analysis device (e.g. a computer arranged to communicate with the control unit) for analysis, control of the measurement setup, storage of data, and display of results. It should be appreciated that the control unit may at least in part be incorporated with the analysis device.

The method/algorithm according to the present invention may be implemented in the control electronics or the analysis device depending on instrumentation configuration.

Furthermore the invention is applicable to other types of feedback systems not only to PI or PID solutions. The invention relates to an iterative method for determining feedback parameters for a digital feedback solution.

The present invention is implemented in a number of aspects in which a first is a scanning probe microscopy (SPM) system comprising,
an SPM measurement device;
a control device;
wherein the control device is arranged to operate an automatic iterative feedback tuning algorithm comprising steps of:
performing a first test with a suitable reference signal as input as set point in a PI regulation algorithm;
receiving a result from the first test by receiving at least one sensor signal;
using the result from the first test as input to a second test as set point;
receiving a result from the second test by receiving at least one sensor signal;
determining a positive definitive matrix using results from the first and second test; and
calculating new control parameters using the determined matrix.

The step of determining the matrix may comprise using an approximation in the form of a unitary matrix.

The feedback algorithm further may comprise a step of performing a third test using the reference signal as test point. The algorithm may further comprise a penalty function.

The sensor signals may have been pre-conditioned.

The feedback process may be repeated iteratively until a suitable feedback parameter determination is received.

A second aspect of the present invention is provided, a method for determining control parameters for controlling a probe position in relation to a sample, comprising:
  performing a first test with a suitable reference signal as input as set point in a PI regulation algorithm;
  receiving a result from the first test;
  using the result from the first test as input to a second test as set point;
  defining a weighting function for the behaviour of the controlled system;
  minimizing the weighting function;
  determining the gradient of the weighting function with respect to the control parameters; and
  using the gradient to determine new control parameters.

A third aspect of the present invention is provided, a computer program for controlling a probe position in relation to a sample, comprising instruction sets for performing the method according to the present invention.

A forth aspect of the present invention is provided, a control device for operating the method according to the present invention.

BRIEF DESCRIPTION OF THE DRAWINGS

The present invention will hereinafter be explained in greater detail by means of non-limiting examples and with reference to the appended drawings in which.

DETAILED DESCRIPTION OF PREFERRED EMBODIMENTS

Figure 8:
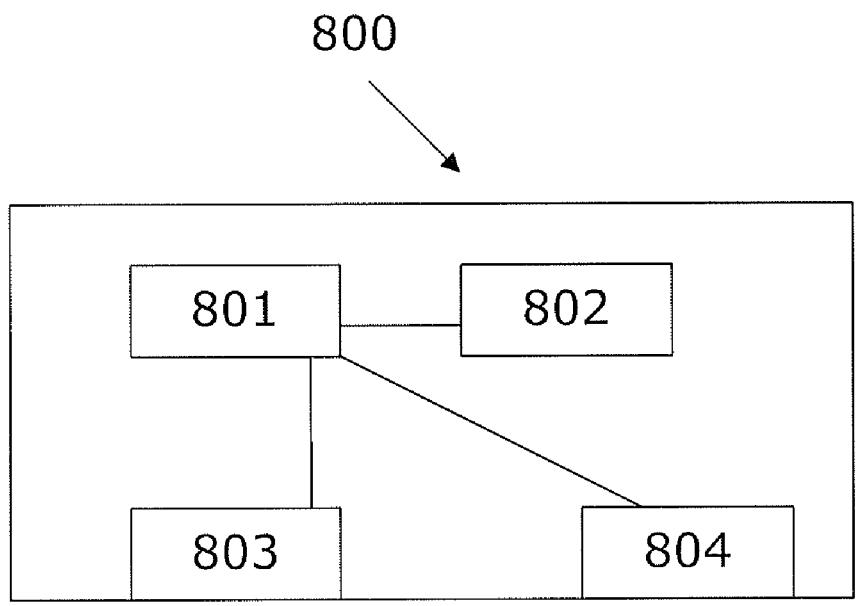
FIG. 8 illustrates schematically in a block diagram a device according to the present invention.
Figure 9:
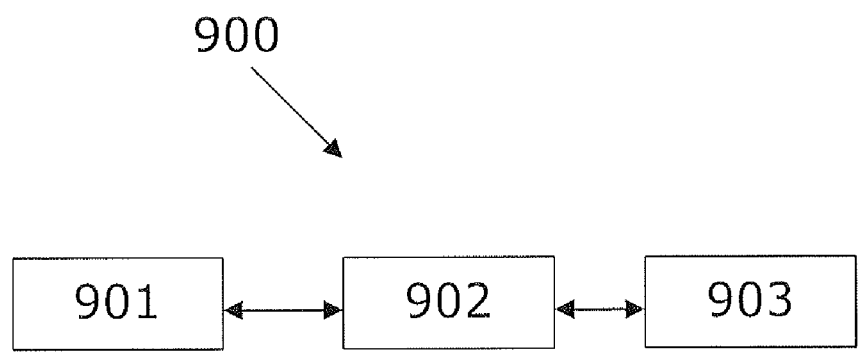
FIG. 9 illustrates schematically in a block diagram a system according to the present invention.

The present invention relates to a solution for automatic feedback control of instrumentation and in other situations where a feedback control is used. This is implemented as a method and advantageously run in a digital computing device such as a computer or similar processing unit. The method/algorithm may be implemented in software instruction sets stored on a computer readable storage medium and run in a processing device or as instruction sets in hardware (e.g. DSP (Digital Signal Processor), FPGA (field programmable gate array), or an ASIC (application specific integrated circuit)). The processing device may comprise a processor, memory (non-volatile and/or volatile), and a communication interface. FIG. 8 illustrates a processing device 800 implementing the present invention, comprising a processing unit 801, a memory unit 802 (volatile or non-volatile, e.g. RAM, Flash, hard disk), and a communication interface 803 to communicate with an instrumentation. FIG. 9 illustrates a system 900 with the present invention, comprising a control processing device 901 in communication with optional control electronics 902 in turn communicating with instrumentation 903. The control processing device and control electronics may be incorporated into one device.

Even though the invention has been exemplified using an STM (Scanning tunnelling microscope) application, it is also usable in other scanning probe microscopy technologies such as AFM (atomic force microscopy), NSOM (near field scanning optical microscopy, MFM (magnetic force microscopy), and so on as understood by the skilled person.

Depending on SPM technology different types of signal(s) are used as input parameter(s) in the feedback system and different types of output signal(s) are generated for controlling the measurement system. Furthermore, different types of pre conditioning of signals may be of interest, such as considering the STM case the signals need to be linearized using a logarithmic expression and the current sign dependence is dealt with; other SPM technologies have other dependencies. The operation of SPM technologies are well known in the art.

A system according to the present invention comprises an SPM measurement system (e.g. comprising a position control device such as a piezo device, a tip holder, tip, and other parts for positioning the tip in relation to a sample of interest), a control electronics system (e.g. comprising voltage or current control devices for controlling the position control device, pre amplifiers and/or other pre conditioning units (filtering and so on), digitalization units, control processing device(s), communication unit(s), and so on), and an analysis device (e.g. a computer arranged to communicate with the control unit) for analysis, control of the measurement setup, storage of data, and display of results. It should be appreciated that the control unit may at least in part be incorporated with the analysis device.

The method/algorithm according to the present invention may be implemented in the control electronics or the analysis device depending on instrumentation configuration.

Furthermore the invention is applicable to other types of feedback systems not only to PI or PID solutions. The invention relates to an iterative method for determining feedback parameters for a digital feedback solution.

The present invention finds applicability in several different fields of technology, for instance scanning probe microscope (SPM) measurement setups from which an example using a scanning tunnelling microscope (STM) setup is used for illustrating the present invention.

Figure 1:
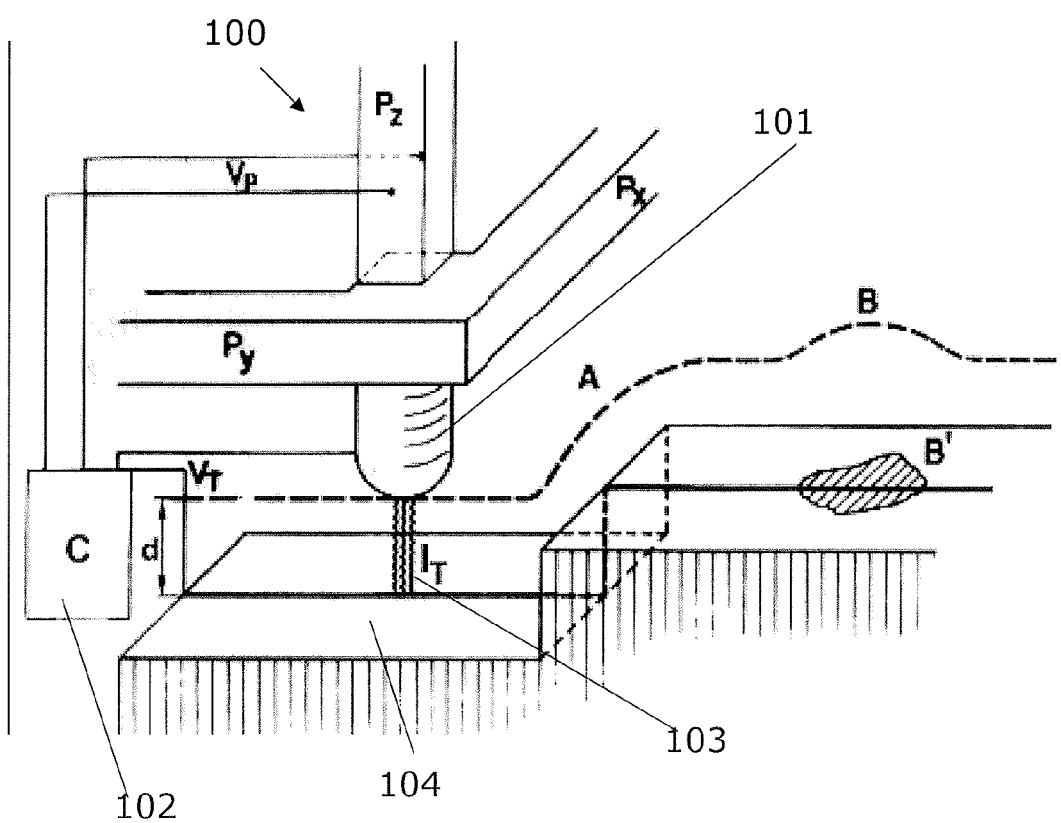
FIG. 1 illustrates schematically an instrumentation for which the present invention finds applicability.

The basic principle of the STM is very simple, see FIG. 1. A sharp conducting needle (tip) 101 is brought with the help of piezoelectric crystals 100 in a distance d of about 1 nm toward a conducting sample 104. Piezoelectric materials expand or contract when a voltage is applied. The usual expansion factor is around 1 to 10 nm/V, so movements in atomic scales are easily controlled by the applied voltage.

A voltage $V_T$ is applied between the tip and the sample and due to the quantum mechanical tunnelling effect a very small current $I_T$ 103 arises, that strongly (in the ideal case exponentially) depends on the distance between tip and sample. By using the feedback controller C 102 it is possible to keep the tunnelling current constant by adjusting the control voltage $V_P$ of the z-piezo, thus the z-position of the tip. Now the tip is moved with high precision in a raster over the sample surface and $V_P$ is recorded, so producing an image of the topography of the surface.

As the piezoelectric materials allow a positioning of the tip with accuracy of less than one Å, the STM is capable of reaching atomic resolution. Among others, studies of the surface structure using real space images are possible.

The voltage of the z-piezo has to be adjusted in such a way, that the tunnelling current and thus (in the case of a pure surface) the distance between tip and surface is constant. The controller has to be fast enough to allow adequate scanning speed and to be reliable and stable enough to ensure that the tip does not crash into the surface. The dynamics of the piezo and possible oscillations in the setup complicate this task. When the controller is tuned very fast oscillations may occur, especially when the shape of the tunnelling current curve in dependence of the tip-surface distance ($I_T(d)$) changes, for example due to adsorbates on the surface. Thus a well chosen and adjusted controller is needed. Usually PI or PID controllers are used, being tuned by hand by the experimenter. This is especially for the PID controller a challenging task that needs some experience to obtain optimal results in the images.

As the scanned surface is generally unknown, image errors due to bad tuning of the controller are not obvious, techniques like scanning in different directions and comparing the images may help to find them. Another possibility of judging the tuning of the controller is to look at the response if the set point is changed. A fast tuning will result in a fast response or even oscillations, a slow one, which may lead to smoothing out the image of the surface, will lead to a slow adaptation to the set point change.

The emphasis of this work is the adaptation of the Iterative Feedback Tuning algorithm to ease the tuning procedure. IFT tunes the response to a set point change to fit to a desired response. Another task is then to find a response that results in good scanning behaviour of the STM, an example will be given later in this document.

Figure 2:
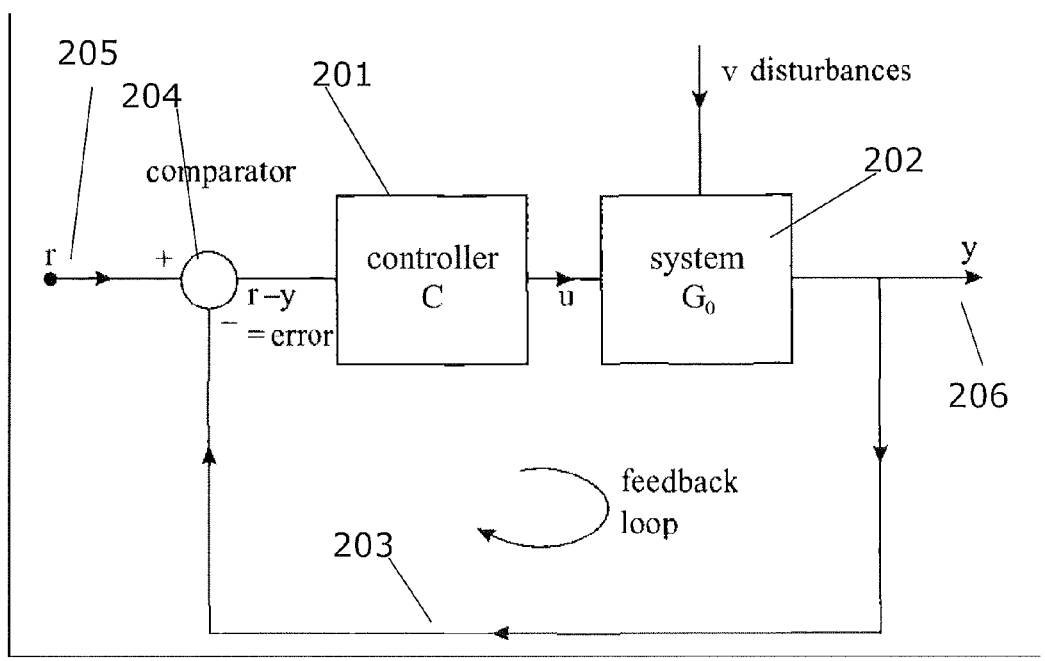
FIG. 2 illustrates schematically in a block diagram a closed loop feedback control solution according to the present invention.

In FIG. 2 a feedback system is shown, comprising a controller 201 acting on a measurement system 202 with a disturbance. Output 206 I measured and feedback data 203 is sent back to the controller via a comparator 204 operating on an input signal 205. It may be shown that for a closed loop system, like in FIG. 2, assuming some constraints on the involved operators, the output signal may be written as:

$$y(t) = G_0(t)u(t) = \frac{G_0(t)C(t)}{1+G_0(t)C(t)} r(t)$$

As the operators $C(t)$ and $G_0(t)$ might be complicated and include among other things integrations and differentiations, these calculations may be quite difficult. Also it is not easily possible to get the operators from experiments. If one knows the impulse response $g(t)$ of a system $G(t)$, the response $y(t)$ to any given input signal $r(t)$ may be derived by convolution:

$$y(t) = g(t) * r(t) = \int_0^t g(t-\tau)r(\tau)d\tau \qquad \text{Eq. (1)}$$

Fortunately things get a lot easier when applying the Laplace transform. The fundamentals of Laplace transforms are known to the skilled person. A unit impulse function at time $t=0$ transfers to unity in Laplace space, so the inverse Laplace transform of the transfer function $G(s)$ may directly be used in equation 1 to determine the response of a known system to an arbitrary time signal $r(t)$.

$$y(t) = g(t) * r(t) \qquad \text{Eq. (2)}$$
$$= \int_0^t g(t-\tau)r(\tau)d\tau$$
$$= \int_0^t \mathcal{L}^{-1}\{1\cdot G(s)\}(t-\tau)r(\tau)d\tau$$

It may also be derived by:

$$y(t) = \mathcal{L}^{-1}\{Y(s)\} = \mathcal{L}^{-1}\{G(s)\mathcal{L}\{r(t)\}\} = \mathcal{L}^{-1}\{G(s)R(s)\} \qquad \text{Eq. (3)}$$

As the transfer function completely defines a process behaviour it may be analyzed in different ways. Especially the location of the poles and zeros of the transfer function in the complex plane are of interest. For example a pole in the real half of the complex plane indicates instability of the system and poles with non zero imaginary part indicate oscillatory behaviour. The nearer a pole or zero is to the origin, the more prominent is its influence. So a plot of the poles and zeros of a system may offer a lot of information for the experienced viewer. This phenomenon is used in controller design e.g. for the techniques of pole placement and the root locus method (e.g. [11], [12]). It is for example possible to cancel a pole in the real half of the complex plane of a process (leading to instability) by placing a zero of the controller in the same spot, if the process is stable enough, that means the pole does not change its position too much with time. The mathematics involved are e.g. Cauchy's integral theorem and formula, Laurent series and the concept of residues. A problem arises when we have to transform a signal from Laplace space back to time space. The mathematical definition is:

$$\mathcal{L}^{-1}\{F(s)\} = f(t) = \frac{1}{2\pi i}\int_{c-i\infty}^{c+i\infty} \exp(st)F(s)ds \quad t>0 \qquad \text{Eq. (4)}$$

where c has to be chosen such that the path of integration is in the convergence area along a line parallel to the imaginary axis and such that c is larger than the real parts of all singular values of F(s). In practice the easiest way to perform the inverse transformation is to decompose complicated functions to sums of less complicated functions. If F(s) is a rational function (quite common, as exponentials, derivatives and integrals transfer to rational functions) partial fraction decomposition and the theory of residuals are commonly used. Those simpler functions may be transferred by usage of tables (see e.g. [13], [12], [14]) and the result is obtained as the sum of those.

In a practical control problem the process to be controlled is commonly unknown or at least not known to a sufficient level to be able to write down the transfer function. In some simple cases it might be possible to calculate it from first principles, but in general it has to be obtained from experiments or another approach, that does not need the transfer function, has to be chosen.

The response of a linear system to a sinusoidal reference signal remains in the steady state a sinusoidal with a differing amplitude and a phase shift. For the frequency response method this experiment is performed for a range of frequencies. Common ways to visualize the resulting amplitudes and phase shifts are the Bode plot and the Nyquist plot. There are graphical methods to get a rough approximation of the transfer function from these, (see e.g. [11] and [12]). As in a step reference signal all frequencies are contained, there are methods to transform the obtained data from a step response experiment to frequency response data, but naturally the obtained accuracy is better for the frequency response, as much more data is used and the method works in steady state and is much less sensitive to external influences and noise.

If a better model than a rough approximation is needed, then the effort to achieve this will be large. Fortunately there are off-the-shelf controllers like the PID controller that may successfully control a large variety of processes without having an exact model. To tune the parameters of these controllers might still be difficult and experiments like a step response might help, but the overall needed effort is reduced a lot.

Figure 3:
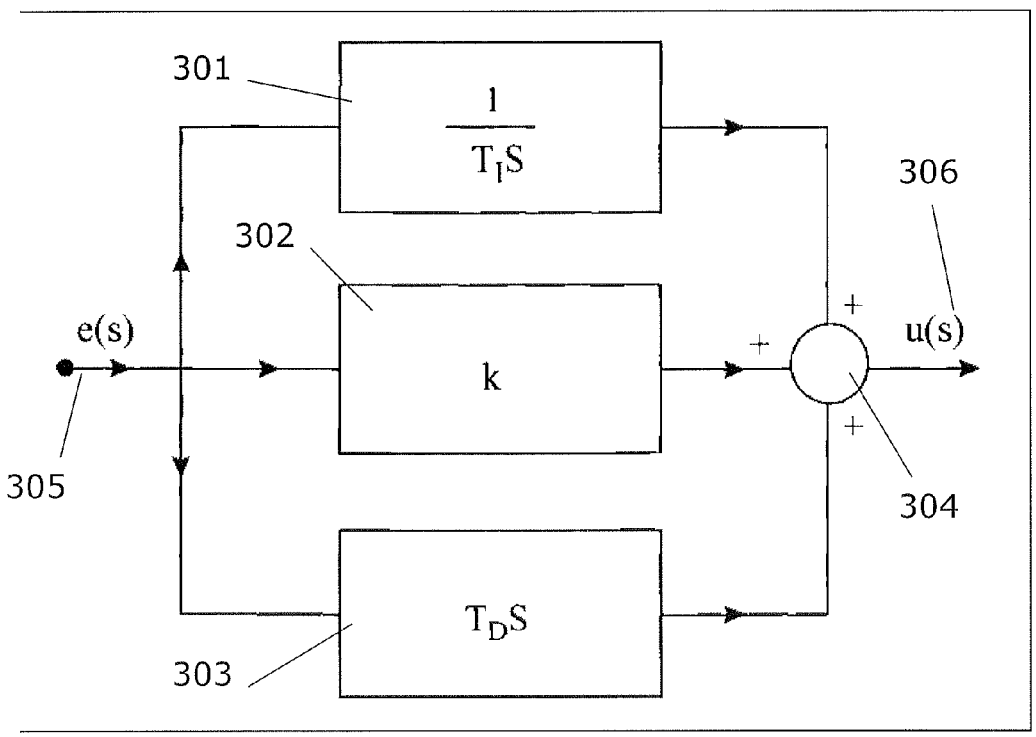
FIG. 3 illustrates schematically in a block diagram a closed loop feedback PID solution according to the present invention.

The PID controller is one of the most popular controller types, widely used in industry as well as in research and all other possible fields. It is its simplicity combined with the ability to successfully control a wide range of different processes as well as its simple realization using analogue electronics that led to its popularity. The letters PID stand for the Proportional, Integral and Differential operation. A block diagram of the controller is shown in FIG. 3 with Proportional, Integral and Differential parts 301, 302, and 303, and an input and output part 305, 306, where the PID parts are summed 304.

In time domain one possible representation of the operator of the PID-controller is:

$$C(t) = K + \frac{1}{T_i} \int_0^t dt + T_d \frac{d}{dt} \qquad \text{Eq. (5)}$$

The Laplace transform therefore is:

$$C(s) = K + \frac{1}{T_i s} + T_d s = \frac{T_d s^2 + K s + \frac{1}{T_i}}{s}$$

In many textbooks the operator of the PID controller is written as:

$$C(t) = K\left(1 + \frac{1}{T_i} \int_0^t dt + T_d \frac{d}{dt}\right)$$

This representation leads to interacting parameters, so the first definition (Eq. 5) will be used in the following. For more complicated calculations it is also desirable to have all parameters in a linear fashion, so later the following form will be used:

$$C(t) = P + I \int_0^t dt + D \frac{d}{dt} \qquad \text{Eq. (6)}$$

In a closed loop system this controller is quite powerful. The influences of the different parts are discussed in the following.

Figure 4:
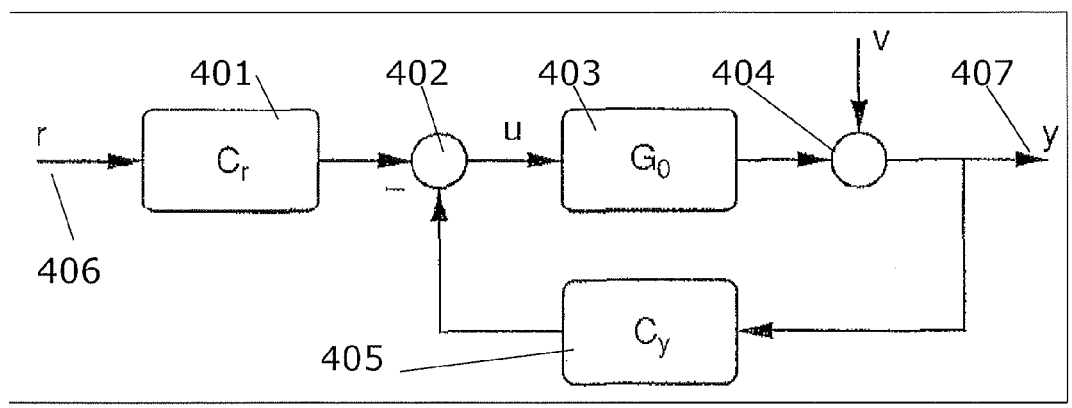
FIG. 4 illustrates schematically in a block diagram a closed loop feedback control solution with two degrees of freedom, according to the present invention.

Iterative feedback tuning (IFT) is a method to tune any given but known controller (with differentiable transfer function) with respect to a vector of parameters p controlling an unknown but experimentally accessible process to a desired behaviour. In opposite to most other tuning algorithms no model for the process is needed, the optimization process is directly steered by experiments. For this a weight function for the behaviour of the controlled system is defined, that should be minimized. Then the gradient of this weight function with respect to the controller parameters is estimated and used to find optimal controller parameters. In general the IFT algorithm may be used on two degree of freedom controllers, as shown in FIG. 4. Here two different controllers 401, 405 may be used on the reference signal r 406 (controller $C_r$) and the fed back output signal y 407 (controller $C_y$). $G_0$ is the measurement system 403 and 402 and 404 each denote comparator and summation device respectively.

Figure 5:
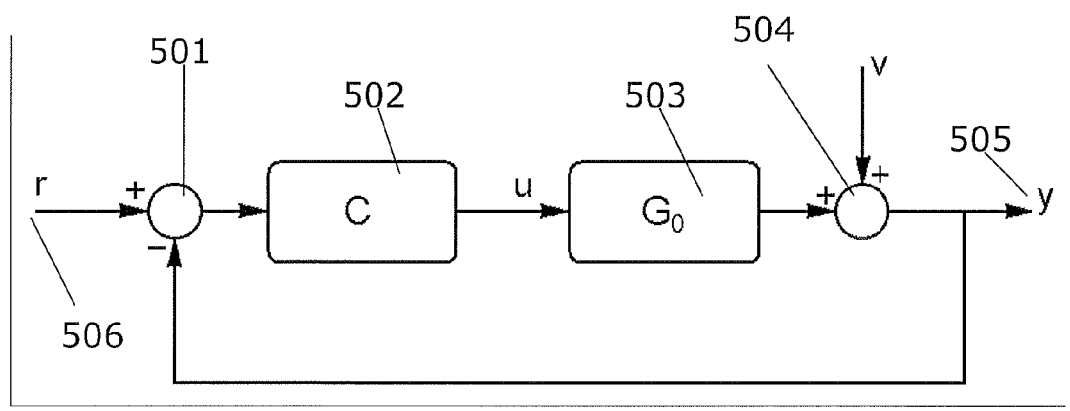
FIG. 5 illustrates schematically in a block diagram a closed loop feedback control solution with one degree of freedom, according to the present invention.

In the case of the STM the reference signal r (i.e. the current set point) is held constant during scanning and a one degree of freedom controller as shown in FIG. 5 is sufficient, with an input signal 506, a comparator 501, a controller 502, a measurement system 503, a summation entity 504 for adding a disturbance, and finally the output signal 505. This simplifies the calculations and will be used in the following. A broad presentation of the IFT algorithm also for the two degree of freedom controller is given in [2].

In the case of the STM also some other changes to the original algorithm have to be made, those will be addressed later. First the original algorithm reduced to a one degree of freedom controller is presented.

As the IFT algorithm will run on a digital computer all time signals exist in discrete time steps, noted by a subscript t. The calculations require the different signals both in time and Laplace domain, so the following notation will be used: The subscript t is used if the signal in time domain is meant; in the Laplace domain this subscript is omitted. So a signal x written as $x_t$ addresses the discrete time representation, only x (=x(s)) addresses the Laplace transformed signal. The controller to be tuned has the transfer function C(ρ) in dependence of the parameter vector ρ, e.g. for the PID-controller C=P+I/s+Ds, ρ=(P,I,D)$^T$. According to FIG. 5, the response of the unknown system $G_0$ may be written as:

$$y(\rho) = G_0 u(\rho) + v$$

Here y(ρ) is the output of the process, u(ρ) is the input signal of the process and v denotes an unmeasurable disturbance. The signal u(ρ) may be written as:

$$u(\rho) = C(\rho) \cdot (r - y)$$

Now y(ρ) may be directly written as:

$$y(\rho) = \frac{C(\rho) G_0}{1 + C(\rho) G_0} r + \frac{1}{1 + C(\rho) G_0} v \qquad \text{Eq. (7)}$$

Defining the closed loop response $T_0(\rho)$ and the sensitivity function $S_0(\rho)$:

$$T_0(\rho) = \frac{C(\rho) G_0}{1 + C(\rho) G_0}$$

$$S_0(\rho) = \frac{1}{1 + C(\rho) G_0}$$

y(ρ) may be rewritten as:

$$y(\rho) = T_0(\rho) r + S_0(\rho) v \qquad \text{Eq. (8)}$$

The desired output of the system $y^d$ to a reference signal r is defined by a reference system $T_d$ in the following way:

$$y^d = T_d r$$

If the goal is only to follow the reference, this becomes $T_d=1$ and $y^d=r$. For the algorithm only the difference between output y(ρ) and desired output $y_d$ is of interest, denoted by $\tilde{y}(\rho)$:

$$\tilde{y}(\rho) = y(\rho) - y^d \qquad \text{Eq. (9)}$$
$$= \left(\frac{C(\rho)G_0}{1+C(\rho)G_0}r - y^d\right) + \frac{1}{1+C(\rho)G_0}v$$
$$= (T_0 - T_d)r + S_0 v$$

We may see that the error comprise of two parts, one error due to incorrect tracking of the reference and the other due to the disturbances. The aim of the optimization procedure then is to minimize a norm of $\tilde{y}(\rho)$, in this case a quadratic criterion is used for the weight function J.

$$J(\rho) = \frac{1}{2N}\left[\lambda_y \sum_{t=1}^{N}(L_y \tilde{y}_t(\rho))^2 + \lambda_u \sum_{t=1}^{N}(L_u u_t(\rho))^2\right] \qquad \text{Eq. (10)}$$

Here N is the number of discrete time intervals in which the signals are measured, $\lambda_y$ and $\lambda_u$ are weighting factors and $L_y$ and $L_u$ are frequency filters to influence the weight of certain frequencies. For now $L_y$ and $L_u$ are set to unity for ease of calculation, they are included again later on in this document. Setting $\lambda_u > 0$ a penalty to the control signal is introduced. A time dependent weighting may also be introduced.

The optimal controller parameters are then found by:

$$\rho_{opt} = \arg\min_\rho [J(\rho)]$$

To find the minimum of the weight function with respect to ρ we have to solve the equation:

$$0 = \frac{\partial J}{\partial \rho}(\rho) = \frac{1}{N}\left[\lambda_y \sum_{t=1}^{N}\tilde{y}_t(\rho)\frac{\partial \tilde{y}_t}{\partial \rho}(\rho) + \lambda_u \sum_{t=1}^{N}u_t(\rho)\frac{\partial u_t}{\partial \rho}(\rho)\right]$$

To solve this equation iteratively the following algorithm may be used:

$$\rho_{i+1} = \rho_i - \gamma_i R_i^{-1}\frac{\partial J}{\partial \rho}(\rho_i) \qquad \text{Eq. (11)}$$

Here γi is a positive real scalar that defines a step size and $R_i$ is an appropriate positive definite matrix, mostly a Gauss-Newton approximation of the Hessian of J. More about the choice of $R_i$ will follow later.

So we have to calculate a $\partial J/\partial \rho(\rho)$. From an experiment we know $\tilde{y}_t(\rho)$ and $u_t(\rho)$. $\partial \tilde{y}_t/\partial \rho(\rho)$ and $\partial u_t/\partial \rho(\rho)$ may be obtained from iterative experiments as shown in the following.

From equation 9 it follows that:

$$\frac{\partial \tilde{y}}{\partial \rho}(\rho) = \frac{\partial y}{\partial \rho}(\rho)$$

and with equation 7 we get:

$$\frac{\partial y}{\partial \rho}(\rho) = \frac{G_0}{1+C(\rho)G_0}\frac{\partial C}{\partial \rho}(\rho)r - \frac{C(\rho)G_0^2}{(1+C(\rho)G_0)^2}\frac{\partial C}{\partial \rho}(\rho)r - \qquad \text{Eq. (12)}$$
$$\frac{G_0}{(1+C(\rho)G_0)^2}v$$
$$= \frac{1}{C(\rho)}\frac{\partial C}{\partial \rho}(\rho)T_0(\rho)r -$$
$$\frac{1}{C(\rho)}\frac{\partial C}{\partial \rho}(\rho)([T_0]^2(\rho)r + T_0(\rho)S_0(\rho)v)$$
$$= \frac{1}{C(\rho)}\frac{\partial C}{\partial \rho}(\rho)T_0(\rho)r - \frac{1}{C(\rho)}\frac{\partial C}{\partial \rho}(\rho)T_0(\rho)y$$
$$= \frac{1}{C(\rho)}\frac{\partial C}{\partial \rho}(\rho)T_0(\rho)(r-y) \qquad \text{Eq. (13)}$$

The quantity $T_0(\rho)x$, where x is an arbitrary signal may be obtained approximately by performing an experiment with input x, as we may see from equation 8. So a possible procedure to obtain a $\partial \tilde{y}/\partial \rho(\rho)$ is:

Perform a first experiment with a suitable reference signal r as input, the output is $$y^1(\rho) = T_0(\rho)r + S_0(\rho)v^1 \qquad \text{Eq. (14)}$$

Perform a second experiment with $r-y^1$ as input, the output is $$y^2(\rho) = T_0(\rho)(r-y^1(\rho)) + S_0(\rho)v^2 \qquad \text{Eq. (15)}$$

Then an estimation of $\partial \tilde{y}/\partial \rho(\rho)$ may be calculated:

$$est\left[\frac{\partial \tilde{y}}{\partial \rho}(\rho)\right] = \frac{1}{C(\rho)}\frac{\partial C}{\partial \rho}(\rho)y^2(\rho) \qquad \text{Eq. (16)}$$

This estimation is only perturbed by the disturbances $v^1$ and $v^2$.

It is possible to obtain $\partial u/\partial \rho(\rho)$ in a similar way. From FIG. 5 we may see that:

$$u(\rho) = \frac{C(\rho)}{1+C(\rho)G_0}r - \frac{C(\rho)}{1+C(\rho)G_0}v$$
$$= S_0(\rho)C(\rho)(r-v)$$

We also know that:

$$\frac{\partial S_0}{\partial \rho}(\rho) = -\frac{1}{C}T_0(\rho)S_0(\rho)\frac{\partial C}{\partial \rho}(\rho)$$

So we get:

$$\frac{\partial u}{\partial \rho}(\rho) = S_0(\rho)\frac{\partial C}{\partial \rho}(\rho)[r - (T_0(\rho)r + S_0(\rho)v)] \qquad \text{Eq. (17)}$$
$$= S_0(\rho)\frac{\partial C}{\partial \rho}(\rho)(r-y)$$
$$= S_0(\rho)\frac{\partial C}{\partial \rho}(\rho)r - S_0(\rho)\frac{\partial C}{\partial \rho}(\rho)y$$

The reference signals of the experiments introduced before are:

The first experiment with reference signal r (experiment 14):

$$u^1(\rho) = S_0(\rho)C(\rho)(r - v^1)$$

The second experiment with reference signal $(r - y^1)$ (experiment 15):

$$u^2(\rho) = S^0(\rho)C(\rho)(r - y^1 - v^2)$$

Using equation 17 we get:

$$u(\rho) = u^1(\rho) \quad \text{Eq. (18)}$$

$$est\left[\frac{\partial u}{\partial \rho}(\rho)\right] = \frac{1}{C(\rho)} \frac{\partial C}{\partial \rho}(\rho) u^2(\rho) \quad \text{Eq. (19)}$$

With these experimentally obtained quantities it is possible to calculate an estimate for the gradient of the weight function J:

$$est\left[\frac{\partial J}{\partial \rho}(\rho)\right] = \frac{1}{N} \sum_{t=1}^{N} \left(\lambda_y \tilde{y}_t(\rho) est\left[\frac{\partial \tilde{y}_t}{\partial \rho}(\rho)\right] + \lambda_u u_t(\rho) est\left[\frac{\partial u_t}{\partial \rho}(\rho)\right]\right) \quad \text{Eq. (20)}$$

In the simplest case one may use the unity matrix for R in the iterative equation 11. This gives the negative gradient direction. A better way is to use a Gauss-Newton approximation of the Hessian of J, which is given by:

$$R = \frac{1}{N} \sum_{t=1}^{N} \left(\lambda_y \cdot est\left[\frac{\partial \tilde{y}_t}{\partial \rho}(\rho)\right] est\left[\frac{\partial \tilde{y}_t}{\partial \rho}(\rho_i)\right]^T + \lambda_u \cdot est\left[\frac{\partial u_t}{\partial \rho}(\rho)\right] est\left[\frac{\partial u_t}{\partial \rho}(\rho_i)\right]^T\right) \quad \text{Eq. (21)}$$

This approximation is biased due to the disturbances in the second experiment, but all occurring quantities are known from the algorithm. A more sophisticated non biased version of the Hessian for R is introduced in [18] by F. De Bruyne and L. C. Kammer, which results in an algorithm with guaranteed stability.

The algorithm then is the following:
1. Perform an experiment with set point vector r and controller parameters $\rho_i$, get the results $y^1_i$ and $u^1_i$
2. Perform an experiment with set point vector $(r - y^1_i)$ and controller parameters $\rho_i$, get the results $y^2_i$ and $u^2_i$
3. Calculate $\tilde{y}(\rho_i)$, (using eq. 9), $u(\rho_i)$ (using eq. 18), $$est\left[\frac{\partial \tilde{y}}{\partial \rho}(\rho_i)\right]$$

(using eq. 16), $$est\left[\frac{\partial u}{\partial \rho}(\rho_i)\right]$$

(using eq. 19) and $$est\left[\frac{\partial J}{\partial \rho}(\rho_i)\right]$$

(using eq. 20)
4. Calculate $R_i$ using e.g. eq. 21
5. Calculate the new controller parameters $\rho_{i+1}$ using eq. 11
6. Repeat from step 1 replacing i by i+1 or abort algorithm if the results are satisfying.

As mentioned above it is sometimes desirable to use time weighting in the weight function J. When for example a change in the set point should be followed as fast as possible and the trajectory of this change is unimportant as long as there is not much overshoot, a very easy to implement way is to apply zero weighting to a specified time period after the change in set point. If the set point change occurs at t=0 and the length of the mask (and thus the time the system is given to adapt to the new set point) is $t_0$, the following changes have to be made. The weight function J($\rho$) (4.4) with $L_y = L_u = 1$ changes to:

$$J(\rho) = \frac{1}{2N}\left[\lambda_y \sum_{t=t_0}^{N}(L_y \tilde{y}_t(\rho))^2 + \lambda_u \sum_{t=1}^{N}(L_u u_t(\rho))^2\right]$$

and $$est\left[\frac{\partial J}{\partial \rho}(\rho)\right]$$

changes to:

$$est\left[\frac{\partial J}{\partial \rho}(\rho)\right] = \frac{1}{N}\left(\lambda_y \sum_{t=t_0}^{N} \tilde{y}_t(\rho) est\left[\frac{\partial \tilde{y}_t}{\partial \rho}(\rho)\right] + \lambda_u \sum_{t=1}^{N} u_t(\rho) est\left[\frac{\partial u_t}{\partial \rho}(\rho)\right]\right)$$

It is also possible to apply a mask to the control signal in the same way.

In practice the easiest way to do this is to simply set $\tilde{y}(\rho)$ and if necessary $u(\rho)$ to zero in the masked time windows, this way it is also easy to handle multiple masked steps in the reference signal r at arbitrary times. O. Lequin et all suggest in [3] for minimal transition time at set point changes without oscillations to start with large masked time windows and decrease them in steps until oscillations occur.

Figure 6:
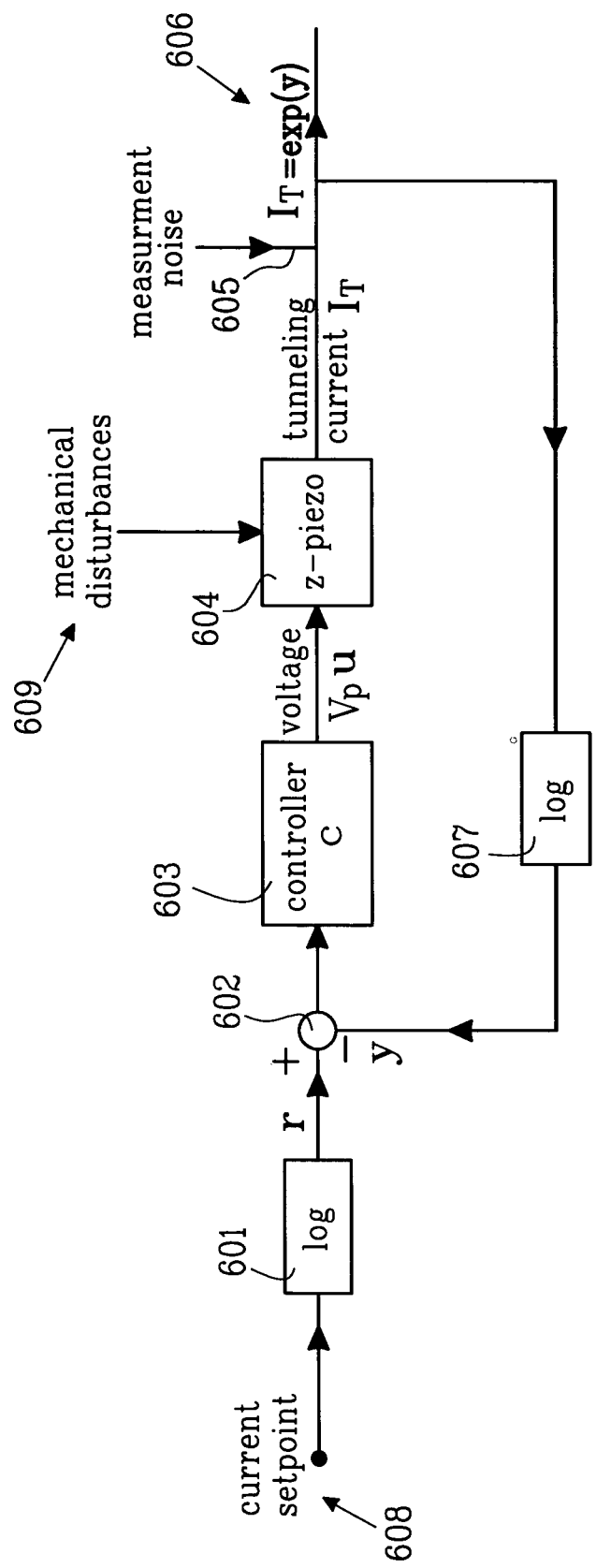
FIG. 6 illustrates schematically in a block diagram a closed loop feedback control solution for an STM system according to the present invention.

In the case of the STM some changes to the algorithm have to be made. To linearize the process the algorithm works on the logarithm of the tunnelling current and the set point current. A block diagram of the STM system is shown in FIG. 6, with two log functions 601 and 607, a controller 603, a measurement system 604 with mechanical 609 and electrical measurement noise 605, and an output signal 606. The used quantities in the algorithm are indicated.

Another problem is that the second experiment with the difference between set point signal and result from the first experiment as set point (15) cannot be performed, as it includes negative values. The current between the sample and the tip in the STM has always the same sign (depending on the sign of the bias voltage $V_T$) when varying the distance. To avoid this problem it is possible to use equation 12 instead of equation 13 and perform the second experiment with $y^1$ as set point instead of the difference to r.

Then the procedure is:

Perform a first experiment with a suitable reference signal r as input, the output is $$y^1(\rho)=T_0(\rho)r+S_0(\rho)v^1 \quad \text{Eq. (22)}$$

Perform a second experiment with $y^1$ as input, the output is $$y^2(\rho)=T_0(\rho)(y^1(\rho))+S_0(\rho)v^2 \quad \text{Eq. (23)}$$

Perform a third experiment with the same reference signal r as input, the output is $$y^3(\rho)=T_0(\rho)r+S_0(\rho)v^3 \quad \text{Eq. (24)}$$

We get:

$$est\left[\frac{\partial \tilde{y}}{\partial \rho}(\rho)\right] = \frac{1}{C(\rho)}\frac{\partial C}{\partial \rho}(\rho)T_0(\rho)(y^3(\rho)-y^2(\rho))$$

The third experiment is necessary to avoid correlations between the error in $\tilde{y}(\rho)$ and the error in $$est\left[\frac{\partial J}{\partial \rho}(\rho)\right],$$

which would lead to a biased $$est\left[\frac{\partial J}{\partial \rho}(\rho)\right].$$

The same is true for the input values $u^i$:

The first experiment with reference signal r (experiment 22):

$$u^1(\rho)=S_0(\rho)C(\rho)(r-v^1)$$

The second experiment with reference signal $y^1$ (experiment 23):

$$u^2(\rho)=S_0(\rho)C(\rho)(y^1-v^2)$$

The third experiment with reference signal r (experiment 24):

$$u^3(\rho)=S_0(\rho)C(\rho)(r-v^3)$$

Using equation 17 we get:

$$u(\rho) = u^1(\rho)$$

$$est\left[\frac{\partial u}{\partial \rho}(\rho)\right] = \frac{1}{C(\rho)}\frac{\partial C}{\partial \rho}(\rho)(u^3(\rho)-u^2(\rho))$$

Another point is that in STM there is no use in introducing a penalty toward the control signal, as this is the image producing channel. Another interesting choice is to introduce a penalty to the difference to a desired control signal $u^d$. More about the obtaining of $u^d$ and the use of this possibility follows later. Then the weight function becomes:

$$J(\rho) = \frac{1}{2N}\left[\lambda_y \sum_{t=1}^{N}(L_y\tilde{y}_t(\rho))^2 + \lambda_u \sum_{t=1}^{N}(L_u\tilde{u}_t(\rho))^2\right]$$

with $\tilde{u}$ defined similar to $\tilde{y}$ in equation 9:

$$\tilde{u}(\rho)=u(\rho)-u^d$$

It follows $$\frac{\partial \tilde{u}}{\partial \rho}(\rho) = \frac{\partial u}{\partial \rho}(\rho)$$

and equation 19 may be used. The derivative of the weight function becomes:

$$est\left[\frac{\partial J}{\partial \rho}(\rho)\right] = \frac{1}{N}\left(\lambda_y \sum_{t=1}^{N}\tilde{y}_t(\rho)est\left[\frac{\partial y_t}{\partial \rho}(\rho)\right] + \lambda_u \sum_{t=1}^{N}\tilde{u}_t(\rho)est\left[\frac{\partial \tilde{u}_t}{\partial \rho}(\rho)\right]\right)$$

When implementing the algorithm a practical problem occurs with the Laplace transform. The signals $y^i$ and $u^i$ are obtained in time domain, the calculation of $\partial y/\partial \rho(\rho)$ and $\partial u/\partial \rho(\rho)$ require them in the Laplace domain and the calculation of $\partial J/\partial \rho(\rho)$ requires $\partial y_t/\partial \rho(\rho)$ and $\partial u_t/\partial \rho(\rho)$ in time domain again. The problem is to calculate the following quantities:

$$est\left[\frac{\partial \tilde{y}_t}{\partial \rho}(\rho)\right] = \mathcal{L}^{-1}\left\{est\left[\frac{\partial \tilde{y}}{\partial \rho}(\rho)\right]\right\}$$

$$= \mathcal{L}^{-1}\left\{\underbrace{\frac{1}{C(\rho)}\frac{\partial C}{\partial \rho}(\rho)}_{=C'(\rho)}(y^3(\rho)-y^2(\rho))\right\}$$

$$est\left[\frac{\partial \tilde{u}_t}{\partial \rho}(\rho)\right] = \mathcal{L}^{-1}\left\{est\left[\frac{\partial \tilde{u}}{\partial \rho}(\rho)\right]\right\}$$

$$= \mathcal{L}^{-1}\left\{\underbrace{\frac{1}{C(\rho)}\frac{\partial C}{\partial \rho}(\rho)}_{=C'(\rho)}(u^3(\rho)-u^2(\rho))\right\}$$

Transforming the signals $y^i$ and $u^i$ in the Laplace domain may be done, but the inverse transform of $\partial y/\partial \rho(\rho)$ and $\partial u/\partial \rho(\rho)$ would need sophisticated numerical algorithms; examples are presented in [15], [16] and [17]. A more convenient way is to transform the quantity C', which only depends on the known controller, to time domain and to convolute the results according to equation 1. So we get:

$$est\left[\frac{\partial \tilde{y}_t}{\partial \rho}(\rho)\right] = \mathcal{L}^{-1}\{C'(y^3(\rho)-y^2(\rho))\}$$

$$= \mathcal{L}^{-1}\{C'\}*(y_t^3(\rho)-y_t^2(\rho))$$

$$est\left[\frac{\partial \tilde{u}_t}{\partial \rho}(\rho)\right] = \mathcal{L}^{-1}\{C'(u^3(\rho)-u^2(\rho))\}$$

$$= \mathcal{L}^{-1}\{C'\}*(u_t^3(\rho)-u_t^2(\rho))$$

The STM used for the experiments has only a PI controller. The Laplace transform of the PI controller is:

$$C(s) = P + \frac{I}{s} = P \cdot \frac{s+\frac{I}{P}}{s}$$

Using the parameter vector $\rho = (P, I)^T$ we get:

$$\frac{\partial C}{\partial \rho}(s) = \left(1, \frac{1}{s}\right)^T$$

So we get:

$$C' = \frac{1}{C} \cdot \frac{\partial C}{\partial \rho}$$

$$= \frac{1}{P} \cdot \frac{1}{s + \frac{I}{P}} \cdot \binom{s}{1}$$

$$\Rightarrow \mathcal{L}^{-1}\{C'\} = \frac{1}{P} \cdot \exp\left[-\frac{I}{P}(t-\tau)\right] \cdot \binom{\frac{\partial}{\partial t}}{1}$$

That means the derivatives may be calculated by:

$$est\left[\frac{\partial \tilde{y}_t}{\partial \rho}(\rho)\right] = \mathcal{L}^{-1}\{C'\} * (y_t^3(\rho) - y_t^2(\rho))$$

$$= \frac{1}{P} \cdot \int_0^\tau \exp\left[-\frac{I}{P}(t-\tau)\right] \cdot$$

$$\left(\begin{array}{c} \left[\frac{\partial}{\partial t'}(y_t^3(\rho, t') - y_t^2(\rho, t'))\right]\Big|_{t'=\tau} \\ (y_t^3(\rho, \tau) - y_t^2(\rho, \tau)) \end{array}\right) d\tau$$

$$est\left[\frac{\partial \tilde{u}_t}{\partial \rho}(\rho)\right] = \mathcal{L}^{-1}\{C'\} * (u_t^3(\rho) - u_t^2(\rho))$$

$$= \frac{1}{P} \cdot \int_0^\tau \exp\left[-\frac{I}{P}(t-\tau)\right] \cdot$$

$$\left(\begin{array}{c} \left[\frac{\partial}{\partial t'}(u_t^3(\rho, t') - u_t^2(\rho, t'))\right]\Big|_{t'=\tau} \\ (u_t^3(\rho, \tau) - u_t^2(\rho, \tau)) \end{array}\right) d\tau$$

Similar calculations for the PID and the ID controller may performed.

Figure 7:
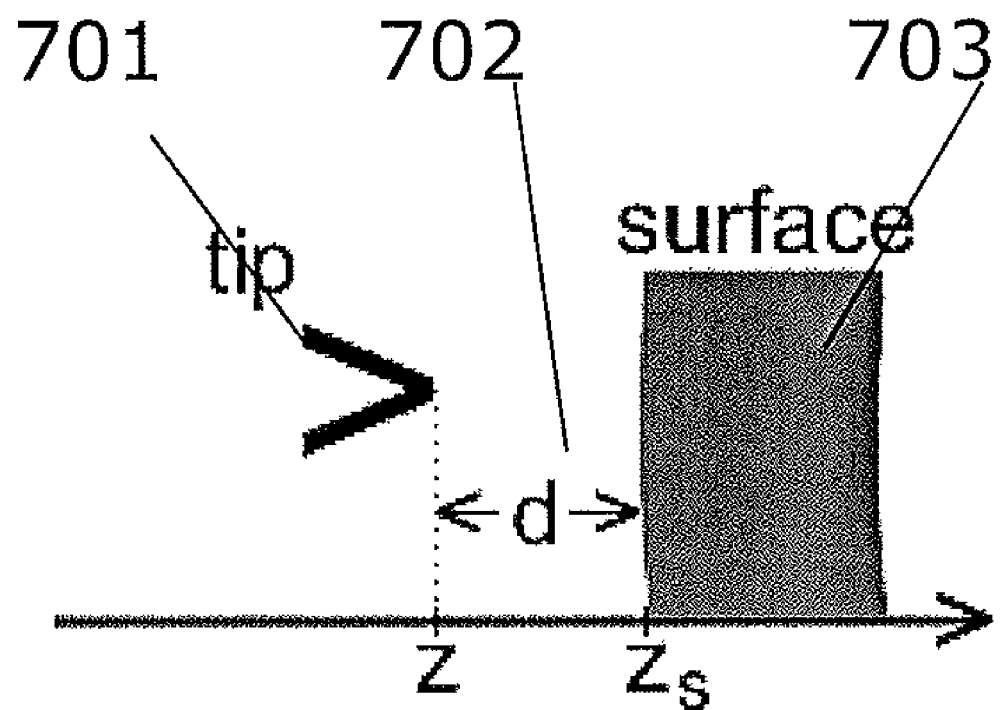
FIG. 7 illustrates schematically a geometrical definition.

The values of the parameters P and I needed to obtain nice images with STM strongly depend on the surface chemistry. The exact distance between surface and tip is normally not known as the position of the surface in the sample holder may vary. The z-position of the tip may therefore only be used for relative measurements. The coordinates are defined by FIG. 7: tip 701, surface 703, and distance 702 between tip and surface.

The tip is at position z, the surface at position $z_s$, the distance d between tip and surface then is $d = z_s - z$. This way the current will increase with increasing z. For the tunnelling current we get:

$$I_T(d) = A\exp(-2\kappa d) = A\exp(-2\kappa(z_s - z))$$

$$\Rightarrow d = \frac{1}{2\kappa} \ln\left(\frac{A}{I_T}\right)$$

The logarithmic feedback loop acts on the error in d instead of the error in $I_T$. We get:

$$\Delta d(t) = d_{set} - d(t) = \frac{1}{2\kappa} \ln\left(\frac{A}{I_{set}}\right) - \frac{1}{2\kappa} \ln\left(\frac{A}{I_T(t)}\right) = \frac{1}{2\kappa} \ln\left(\frac{I(t)}{I_{set}}\right)$$

The feedback loop is then:

$$d_{new}(t) = d_0 + P'\Delta d(t) + I' \int_0^t \Delta d(t) dt$$

$$= d_0 + P' \frac{1}{2\kappa} \ln\left(\frac{I_T(t)}{I_{set}}\right) + I' \int_0^t \frac{1}{2\kappa} \ln\left(\frac{I(t)}{I_{set}}\right) dt$$

$d_0$ is a starting value of the loop, it is not important as the integral part will remove a steady state error after a short time. For the discrete digital loop this becomes:

$$d_{i+1} = d_0 + P' \frac{1}{2\kappa} \ln\left(\frac{I_i}{I_{set}}\right) + I' \sum_{j=1}^{i} \frac{1}{2\kappa} \ln\left(\frac{I_j}{I_{set}}\right) dT$$

where dT is the time interval of one control step.
Translating this to z and defining $$\Delta d_i^{log} = \ln\left(\frac{I_i}{I_{set}}\right)$$

we get:

$$z_{i+1} = z_s - d_0 - \frac{P'}{2\kappa} \Delta d_i^{log} - \frac{I'}{2\kappa} \sum_{j=1}^{i} \Delta d_j^{log} dT$$

$$= z_0 - \underbrace{\frac{P'}{2\kappa}}_{\equiv P} \Delta d_i^{log} - \underbrace{\frac{I'}{2\kappa}}_{\equiv I} \sum_{j=1}^{i} \Delta d_j^{log} dT$$

In a common feedback loop like the one used in the experiments, the values P and I are used and the behaviour of the loop depends on the $\kappa$ value of the sample. If P' and I' would be used instead, the same values should give similar behaviour on different samples. $\kappa$ may normally be measured quite simple by obtaining an $I_T(d)$ curve and fitting a straight line to the logarithm of it, the slope then gives $-2\kappa$. In practice the $I_T(z)$ curve often is not really an exponential (especially when measuring in air) and it is quite difficult to obtain a reliable value for $\kappa$. Also in this case the $I_T(d)$ curve was quite noisy and unstable and an averaging was not yet available in the software.

Using a local $\kappa$ value in the range of the current step and comparing tunings that give the same rise time at least for I there is a hint that the predicted normalization could work, but the influence of P on the rise time is in this setup too small to be analyzed this way. Also the whole conditions are not stable enough to give significant results. To really analyze the K dependence of P and I more than two different clean samples are advantageously used and the experiment is suitably performed in vacuum conditions. Then a similar rise time for a set point change may be used to find comparable values for I, a similar steady state error during the set point change may be used for P.

The IFT algorithm implemented for the measurements was due to time constraints quite simple. The possibility to apply a mask of changeable length for time weighting and optimization of the control signal was included. A frequency weighting was not implemented, but it may be used in an alternative.

The idea of introducing the time weighting for the weight function by applying a mask to a number of steps after a set point change is originally meant to achieve a fast response to a set point change, without trying to force the process to follow a certain trajectory. Not weighting the response in a small window after the set point change allows the process to follow a trajectory natural for the system, which should be faster than any artificial. As a very fast response leads in STM to oscillations during the actual scan, a delayed response, thus a slower tuning, is needed. By starting the optimization with very low values for P and I, thus a slow reaction, and applying a mask with the length of the desired delay, the algorithm should increase the speed of the loop until the desired speed is reached, then a further acceleration should not lead to further reduction of the weight function, thus the algorithm should stop or be aborted. In the ideal case, with the STM replaced by resistors, this works quite well.

For low disturbances like in the case of the resistors or the graphite sample, the algorithm converges when the parameters enter the minimum region as the gradient becomes very low and no further development is needed. When the disturbances are higher, random changes in the gradient lead to movement of the algorithm within the minimum area, thus moving away from the desired parameters. If higher P and I values lead to better disturbance and noise rejection, also a convergence in a different region within the large minimum area is possible.

When starting with low values for P and I it is probable that the algorithm passes the desired slow region. The desired speed of the loop is reached, when the weight function stops decreasing. This point is in practice due to disturbances not easily usable to abort the optimization and also a convergence to the desired values would be preferable. For that a reference model as explained earlier or at least a desired trajectory instead of the mask may be introduced to achieve a convergence also at higher disturbance levels.

The IFT algorithm works with the response of the system to a test signal, the current set point vector. The shape of this signal is very important and should be chosen with care. To use the time weighting method using a mask, the only possible shape is a step or maybe a series of steps. Using more than one step has the advantage of having an average of more than one set point change without averaging noise and oscillations like it would be the case if a real average over more than one experiment would be used. This is essential, as the algorithm should not enhance (if possible it should even reduce) noise and oscillations. Disturbances may lead to strongly perturbed responses to a step in single cases. This may lead to a change of the controller parameters in a wrong direction.

The single responses differ and may in single cases be very disturbed. Using more than one step as a reference signal averages over the single responses without removing noise and oscillations like normal averaging over more than one experiment would. Noise and oscillation have to remain in the response as the algorithm should reduce it and therefore needs the information about it.

The idea behind using steps as set point is that if the loop may handle a steep step on the surface, it should be able to handle any less steep shape. On a real surface such steep steps might be less common and using other more realistic shapes like ramps or other arbitrary forms should be tested. Then the use of a masking window is not possible any more. Completely abandoning the idea of time weighting is not working. Here a reference signal consisting of ramps was used for a gold sample.

Although the algorithm succeeds in reducing the weight function eventually, the response is highly oscillatory. The normal response to the ramp signal would be a delayed following, but the weight function may be reduced by oscillations as the difference to the reference signal is reduced in total. This problem should also be solvable by the introduction of a reference model that allows a desired delay in the response.

To use the possibility of an optimization of the control signal, a desired control signal has to be known. A simple possibility is to use the same shape like the reference current signal, with a certain delay, defined by the masks after the steps. The amplitude of the control signal is not known in advance like for the current signal, as the absolute position of the sample and therefore the tip during scanning is unknown. For a very stable system the control signal amplitudes for the upper and lower current during the step like reference signal may be measured in advance and used for the reference control signal. In the used STM setup there is a slow constant drift in the control signal, probably caused by thermal expansion or contraction of the setup. This problem may be solved as this drift is slow, not noticeable in the timescale of a single experiment of about one thousand control steps at a frequency of 40 kHz, so 25 ms. If the steps in the control signal are long enough to ensure phases of steady state and the controller parameters are high enough to reach steady state in some regions, an averaging to get the desired control signal is possible.

Using the actual STM a bigger problem is the presence of random disturbances, that are eliminated in the current signal by the controller, but that are still present in the control signal. These random disturbances lead to differences of the control signal to the desired control signal that are in the same order or bigger than the differences that lead the optimization process. So this optimization possibility cannot be used here, but it might be useful in other STM setups.

The fact that the control signal is the main image producing signal makes an optimization of the control signal desirable. It is often assumed that a tuning of the feedback loop, that minimizes the current during scanning, leads to the best possible image in the control signal. Simulations show that this is reasonable for systems where the piezo has a high resonance frequency and may thus follow the control signal very quick, but if the resonance frequency is quite low in comparison to the controller frequency (in simulations if the resonance frequency was lower than 1/20 of the controller sampling frequency) the inertia of the piezo leads to overshoots in the control signal to accelerate and slow down the piezo. In this case an optimization for the current would lead to a disturbed image in the control signal although the current would be minimized during the scan.

As the feedback loop does not follow the high frequency noise in the current, the control signal is less noisy. This is an advantage for the algorithm, as the lower noise level gives a better signal to noise ratio.

When the feedback loop is tuned by hand during a scan, there is no noticeable influence of the proportional part of the feedback loop on the obtained image, besides the starting of oscillations above a certain value. As seen in the theoretical treatment of the PID controller, adding the proportional part to a pure integrating controller may speed up the response. As the tuning for the STM is quite slow to avoid oscillations, it seems reasonable that these accelerations might not be needed and the simpler integrating controller might be sufficient. In fact in an experiment with resistors instead of the STM the proportional part delays the reaction of the loop at very high tuning values.

The mechanically light construction of the STM causes a number of mechanical resonances. In first experiments they showed up prominently in the current noise. An additional experiment to find these resonances was performed by inducing them using sound of a changeable frequency. Noticeable resonances around 2.7 kHz, 7.6 kHz and 13.2 kHz were found, here a strong reaction in the current signal of nearly the same frequency occurred. To reduce the high frequency resonances in the current and to avoid an amplification by the feedback loop, a first order low pass filter with $f_0$ of the order of 5 frequency was installed in the preamplifier. $f_0$ was estimated from the maximum desired scanning speed of v of the order of 3 nm/ms at atomic resolution. As a result the noise was reduced by a factor of about 2 and the mechanical resonances do not appear in the frequency spectrum of the current, the oscillations that come probably from the electronics at 4.5 kHz are prominent.

For strongly under damped systems the optimization simulation for the PID as well as the PI controller converges to a state with deactivated P part. This is probably due to the fact that the proportional controller reacts with a control signal proportional to the error, amplifying resonant oscillations in the piezo movement. When the error is zero, thus the piezo is at the correct position, the proportional controller does not react, although the piezo is at its maximum of velocity during the oscillation and should be slowed down to avoid the error in the opposite direction. In other words there is a phase shift of $\pi/2$ between velocity of the piezo and the control signal, leading to amplification of the unwanted resonant oscillations. The desirable phase shift of $\pi$, that would damp the oscillation with maximum efficiency, is theoretically achieved by the derivative part of the controller, provided the noise level is ideally zero or at least small enough. The piezo is modelled by a damped harmonic oscillator with a resonance frequency of 7 kHz and a damping of 0.1 (damping of one means critical damping). The pure integrating controller was tuned quite fast, near to oscillations. The proportional part increases the oscillations but does not increase the speed of the loop. The differential part successfully decreases the oscillations, although there is some noise. The full PID controller does not really show an improvement to the I controller in this simulation.

However, it should be understood that a PID controller or an ID controller may be used using the same type of IFT process for determining suitable control parameters.

The Laplace transform of the PID controller is:

$$C(s) = Ds + P + \frac{I}{s} = \frac{Ds^2 + Ps + I}{s} = D \cdot \frac{s^2 + \frac{P}{D}s + \frac{I}{D}}{s}$$

Using the parameter vector $\rho = (P, I, D)^T$ we get:

$$\frac{\partial C}{\partial \rho}(s) = \left(1, \frac{1}{s}, s\right)^T$$

So the derivative signal can be calculated by:

$$\frac{\partial y}{\partial \rho}(s) = \frac{1}{C} \cdot \frac{\partial C}{\partial \rho} \cdot y_2(s)$$

$$\frac{\partial y}{\partial P}(s) = \frac{1}{D} \cdot \frac{s}{s^2 + \frac{P}{D}s + \frac{I}{D}} \cdot y_2(s)$$

$$\frac{\partial y}{\partial I}(s) = \frac{1}{D} \cdot \frac{1}{s^2 + \frac{P}{D}s + \frac{I}{D}} \cdot y_2(s) = \frac{1}{P} \cdot \frac{1}{s + \frac{I}{P}} \cdot y_2(s)$$

$$\frac{\partial y}{\partial D}(s) = \frac{1}{D} \cdot \frac{s^2}{s^2 + \frac{P}{D}s + \frac{I}{D}} \cdot y_2(s) = \frac{1}{P} \cdot \frac{1}{s + \frac{I}{P}} \cdot y_2(s)$$

Using complex algebra and the definitions:

$$\alpha = \frac{P}{2D}$$

$$\beta = \sqrt{\frac{P^2}{4D^2} - \frac{I}{D}}$$

the reverse transform is given by:

$$\Rightarrow \frac{\partial y}{\partial P}(t) = \int_0^t \frac{1}{\beta D} \exp[-\alpha(t-\tau)] \cdot \sin[\beta(t-\tau)] \cdot \left[\frac{\partial}{\partial t'} y_2(t')\right]\bigg|_{t'=\tau} d\tau$$

$$\Rightarrow \frac{\partial y}{\partial I}(t) = \int_0^t \frac{1}{\beta D} \exp[-\alpha(t-\tau)] \cdot \sin[\beta(t-\tau)] \cdot y_2(t) d\tau$$

$$\Rightarrow \frac{\partial y}{\partial D}(t) =$$

$$\int_0^t \frac{1}{\beta D} \exp[-\alpha(t-\tau)] \cdot \sin[\beta(t-\tau)] \cdot \left[\frac{\partial^2}{\partial t'^2} y_2(t')\right]\bigg|_{t'=\tau} d\tau$$

If complex algebra cannot be used the definition of $\beta$ changes to:

$$\beta = \begin{cases} \sqrt{\frac{P^2}{4D^2} - \frac{I}{D}} & \text{for } \frac{P^2}{4D^2} \geq \frac{I}{D}, \text{ case 1} \\ \sqrt{-\frac{P^2}{4D^2} + \frac{I}{D}} & \text{for } \frac{P^2}{4D^2} < \frac{I}{D}, \text{ case 2} \end{cases}$$

and in case 1 the sine changes to the hyperbolic sine, in case 2 it stays a sine.

IN a similar fashion, the Laplace transform of the ID controller is:

$$C(s) = Ds + \frac{I}{s} = D \cdot \frac{s^2 + \frac{I}{D}}{s}$$

Using the parameter vector $\rho = (I, D)^T$ we get:

$$\frac{\partial C}{\partial \rho}(s) = \left(\frac{1}{s}, s\right)^T$$

So the derivative signal can be calculated by:

$$\frac{\partial y}{\partial \rho}(s) = \frac{1}{C} \cdot \frac{\partial C}{\partial \rho} \cdot y_2(s)$$

$$\frac{\partial y}{\partial I}(s) = \frac{1}{D} \cdot \frac{1}{s^2 + \frac{I}{D}} \cdot y_2(s)$$

$$\frac{\partial y}{\partial D}(s) = \frac{1}{D} \cdot \frac{s^2}{s^2 + \frac{I}{D}} \cdot y_2(s)$$

$$\Rightarrow \frac{\partial y}{\partial I}(t) = \int_0^t \sqrt{\frac{1}{ID}} \sin\left[\sqrt{\frac{I}{D}}(t-\tau)\right] \cdot y_2(\tau) d\tau$$

$$\Rightarrow \frac{\partial y}{\partial D}(t) = \int_0^t \sqrt{\frac{1}{ID}} \sin\left[\sqrt{\frac{I}{D}}(t-\tau)\right] \cdot \left[\frac{\partial^2}{\partial t'^2} y_2(t')\right]\bigg|_{t'=\tau} d\tau$$

It should be appreciated that the possibility to use frequency filters may be considered. The analysis of the linear and logarithmic feedback loops showed, that the logarithmic loop is advantageous.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that at least parts of the invention may be implemented by means of both hardware and software, and that several "means", "units" and "devices" may be represented by the same item of hardware.

The above mentioned and described embodiments are only given as examples and should not be seen to be limiting to the present invention. Other solutions, uses, objectives, and functions within the scope of the invention as claimed in the below described patent claims should be apparent for the person skilled in the art.

REFERENCES

[1] Russell Young, John Ward, and Fredric Scire. The topografiner: An instrument for measuring surface microtopography. Rev. Sci. Instrum., 43:999-1011, 1972.

[2] H. Hjalmarsson, M. Gevers, S. Gunnarsson, and O. sequin. Iterative feedback tuning: theory and applications. Control Systems Magazine, IEEE, 18(4):26-41, August 1998.

[3] Olivier Lequin, Michel Gevers, Magnus Mossberg, Emmanuel Bosmans, and Lionel Triest. Iterative feedback tuning of pid parameters: comparison with classical tuning rules. Control Engineering Practice, 11(9):1023-1033, September 2003.

[4] H. J. Guntherodt and R. Wiesendangar. Scanning Tunneling Microscopy I, volume 20 of Surface Science. Springer-Verlag, 1992.

[5] R. Wiesendanger and H. J. Guntherodt. Scanning Tunneling Microscopy III, volume 29 of Surface Science. Springer-Verlag, 2 edition, 1996.

[6] Andrew Zangwill. Physics at surfaces. Cambridge University Press, 1988.

[7] Krister Svensson. Scanning tunneling microscopy (stm). laboratory instructions, 2006.

[8] L. Libioulle, Y. Houbion, and J.-M. Gilles. Very sharp platinum tips for scanning tunneling microscopy. Review of Scientific Instruments, 66(1):97-100, 1995.

[9] M. C. Baykul. Preparation of sharp gold tips for stm by using electrochemical etching method. Materials Science and Engineering B, 74(1-3):229-233, May 2000.

[10] Anne-Sophie Lucier, Henrik Mortensen, Yan Sun, and Peter Grutter. Determination of the atomic structure of scanning probe microscopy tungsten tips by field ion microscopy. Physical Review B (Condensed Matter and Materials Physics), 72(23):235420, 2005.

[11] J. R. Leigh. Control Theory. The Institution of Electrical Engineers, 2 edition, 2004.

[12] J. J. D'Azzo and C. H. Houpis. Linear Control System Analysis and Design with MatLab. Marcel Dekker, Inc., 5 edition, 2003.

[13] R. C. Dorf and R. H. Bishop. Modern Control Systems. Prentice-Hall, 9 edition, 2001.

[14] I. N. Bronstein, K. A. Semendjajew, G. Musiol, and H. Muhlig. Taschenbuch der Mathematik. Verlag Harri Deutsch, 5 edition, 2001.

[15] Hassan Hassanzadeha and Mehran Pooladi-Darvish. Comparison of different numerical laplace inversion methods for engineering applications. Applied Mathematics and Computation, 198(2):1966-1981, June 2007.

[16] Harald Stehfest. Algorithm 368: Numerical inversion of laplace transforms [d5]. Commun. ACM, 13(1):47-49, 1970.

[17] V. Zakian. Numerical inversions of laplace transforms. Electron Lett., page 120-121, 1969.

[18] Franky De Bruyne and Leonardo C. Kammer. Iterative feedback tuning with guaranteed stability. American Control Conference, 5:3317-3321, 1999.

[19] K. Svensson, Y. Jompol, H. Olin, and E. Olsson. Compact design of a transmission electron microscope-scanning tunneling microscope holder with three dimensional coarse motion. Review of Scientific Instruments, 74(11):4945-4947, November 2003.

[20] Roland Wiesendanger. Scanning probe microscopy and spectroscopy: Methods and Applications. Cambridge University Press, 1994.

The invention claimed is:

1. A scanning probe microscopy (SPM), system (900) comprising,
    an SPM measurement device (903);
    a control device (901, 902);
    wherein the control device is arranged to operate an automatic iterative feedback tuning process comprising steps of:
        performing a first test with a suitable reference signal as input as set point in a PI regulation algorithm;
        receiving a result from the first test by receiving at least one sensor signal;
        using the result from the first test as input to a second test as set point;
        receiving a result from the second test by receiving at least one sensor signal;
        determining a positive definitive matrix using results from the first and second tests; and
        calculating new control parameters using the determined matrix.

2. The system according to claim 1, wherein the step of determining the matrix comprises using an approximation in the form of a unitary matrix.

3. The system according to claim 1, wherein the feedback algorithm further comprises a step of performing a third test using the reference signal as test point.

4. The system according to claim 1, wherein the algorithm further comprises a penalty function.

5. The system according to claim 1, wherein sensor signals have been pre-conditioned.

6. The system according to claim 1, wherein the feedback tuning process is repeated iteratively until a suitable feedback parameter determination is received.

7. A method for determining control parameters for controlling a probe position in relation to a sample, comprising:
- performing a first test with a suitable reference signal as input as set point in a regulation algorithm operating on a controlled system;
- receiving a result from the first test by receiving at least one sensor signal;
- using the result from the first test as input to a second test as set point;
- receiving a result from the second test by receiving at least one sensor signal;
- defining a weighting function for the behaviour of the controlled system;
- minimizing the weighting function;
- determining the gradient of the weighting function with respect to the control parameters; and
- using the gradient to determine new control parameters for use in the PI algorithm.

8. The method according to claim 7, wherein the regulation algorithm use a combination of at least two of a proportional, integrating, and derivative regulation algorithm.

9. A computer program for controlling a probe position in relation to a sample, comprising instruction sets for performing a method according to claim 7.

10. A control device for operating the method according to claim 7.

* * * * *